UNITED STATES PATENT OFFICE.

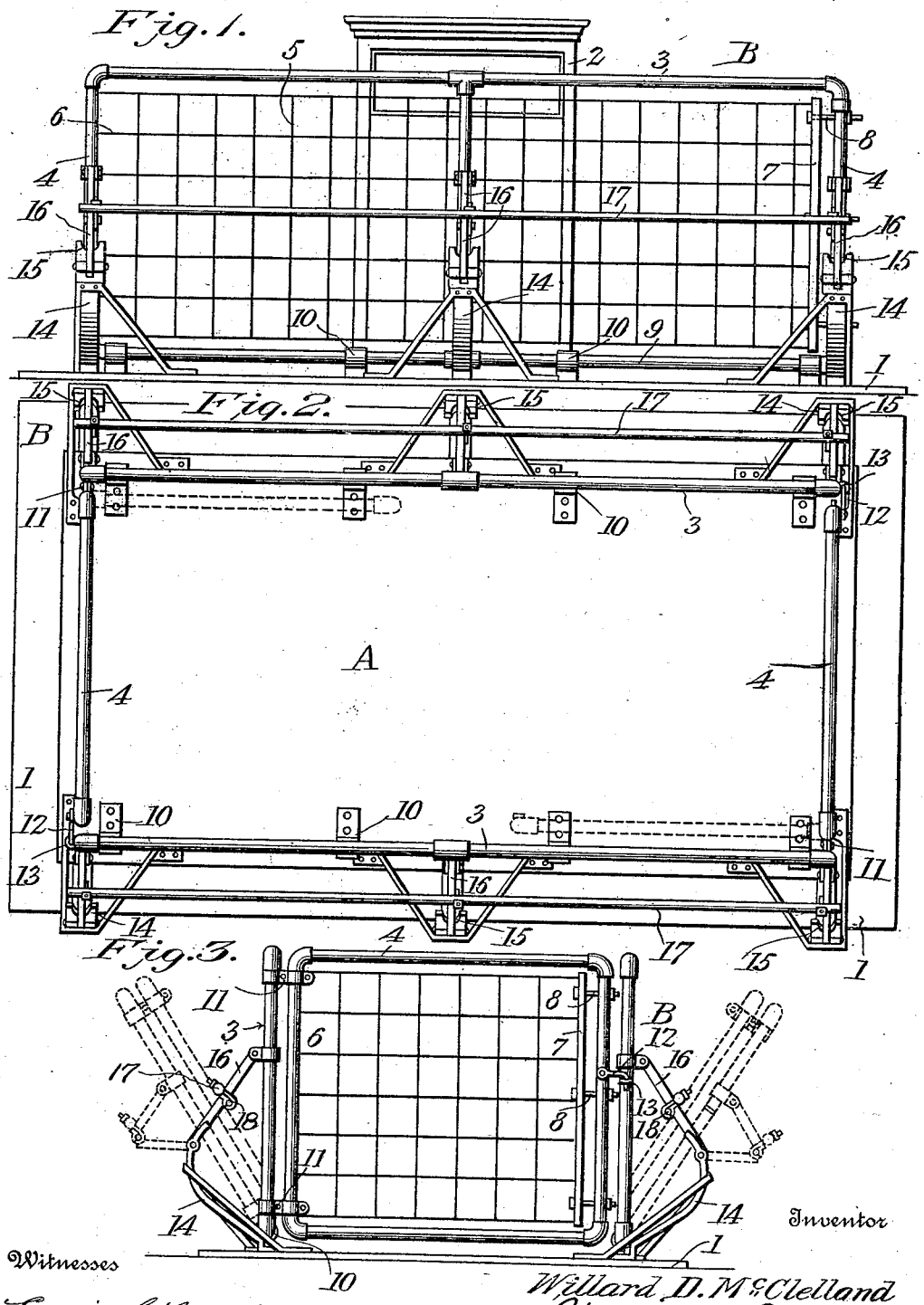

WILLARD D. McCLELLAND, OF TROY, KANSAS.

WAGON-WEIGHING-SCALE ATTACHMENT.

987,587.  Specification of Letters Patent.  Patented Mar. 21, 1911.

Application filed April 8, 1910. Serial No. 554,166.

*To all whom it may concern:*

Be it known that I, WILLARD D. MC-CLELLAND, a citizen of the United States, residing at Troy, in the county of Doniphan and State of Kansas, have invented new and useful Improvements in Wagon-Weighing-Scale Attachments, of which the following is a specification.

This invention relates to wagon weighing scales, and has to do more particularly with an attachment for such scales, whereby live stock can be retained on the platform of the scales during the weighing operation, or bulk material, such as loose hay in a wagon will be permitted to pass upon the scales for weighing the load.

The invention has for one of its objects to provide an extremely simple and inexpensive attachment of this character which can be permanently secured to the platform so as to be set up in operative position when it is desired to be used for inclosed stock to be weighed or can be opened when bulk material is to be weighed or loaded wagons.

The invention has for a further object the provision of means for holding the sides of the attachment locked in closed position, or supported in open inclined position for receiving wagons loaded with hay or the like when such is to be weighed.

With these objects in view, and others as will appear as the description proceeds, the invention comprises the various novel features of construction and arrangement of parts which will be more fully described hereinafter and set forth with particularity in the claims appended hereto.

In the accompanying drawings, which illustrate one embodiment of the invention; Figure 1 is a front view of the attachment applied to a weighing scale. Fig. 2 is a plan view thereof. Fig. 3 is an end view showing by full lines the attachment closed, and by dotted lines the attachment open.

Similar reference characters are employed to designate corresponding parts throughout the several views.

Referring to the drawing, A designates the platform of an ordinary wagon scale of the Fairbanks type, and 1 the sill work or frame around the same, and at one side of the platform is the usual casing or housing 2, for the weighing mechanism.

The attachment B is supported entirely by the platform A and becomes a part of the scales. The attachment B consists of side frames 3 and end frames or gates 4, the frames being constructed of pipe sections coupled together to form a rectangular frame work. Each frame has a wire netting 5 secured at one end to one of the vertical sections 6 of the frame and at the front end of the netting or web 5 is a bar 7 that is connected with the adjacent end of the frame by bolts 8 which serve to tension the netting.

The side frames 3 have their lower horizontal bars or pipe sections 9 rotatably mounted in bearings 10 fastened to the platform A so that the side frames can swing from a vertical position outwardly to an inclined position on horizontal axes. The gates 4 are each carried by a side frame and are adapted to swing on brackets 11 secured to the ends of the side frames and the gates are held in closed position by latches 12 pivoted thereon and engaging in catches 13 on the side frames. These gates are used when animals are to be weighed, since the gates serve to pen the animals in on the platform. The gates swing inwardly parallel with the side frames as shown by dotted lines Fig. 2 when not in use, but, of course, the gates can swing outwardly when driving stock out of the pen.

When the device is not in use, the side frames will be held in the position shown by dotted lines, Fig. 3, by means of brackets 14, secured to the platform and extending outwardly from the side edges thereof, the said brackets having seats 15 for engaging the vertical pipe sections of the side frames. Between the brackets 14 and vertical pipe sections of the side frames are toggle joints 16, which, when set as shown by full lines, Fig. 3, lock the said frames in upright or vertical position, but when the toggle joints are broken, the side frames are supported by the brackets in inclined position as shown by dotted lines, Fig. 3. To enable the toggle joints at each side of the attachment to be simultaneously opened or closed, a bar 17 is connected with each set of toggle joints near their inner joint 18, and hence by pulling outwardly on the rod, the toggle joints connected therewith will be collapsed and by reverse movement, the toggle joints will be closed or straightened. On weighing live stock, the apparatus is set up as shown in the figures, but when wagons are to be weighed, the side frames and their attached gates are swung to one side and supported by the brackets 14.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters Patent is:—

1. An attachment of the class described, comprising side frames, means for pivotally mounting the same on a platform to swing laterally, brackets extending outwardly from the frames for supporting the same in outwardly inclined position, and means between and hingedly connected with the brackets and frames for holding the latter locked in upright position.

2. An attachment of the class described, comprising side frames, means for pivotally mounting the same on a platform to swing laterally, brackets extending downwardly from the frames for supporting the same in outwardly inclined position, devices between the brackets and frames for holding the latter locked in upright position, and means for connecting the devices for each frame together for simultaneously locking and unlocking the same.

3. The combination of a weighing scale platform, with elements extending along the edges of the platform to swing laterally from an upright position, brackets on the platform and extending outwardly from the said elements to support the latter in outwardly inclined position, and toggle joints between the brackets and elements for holding the latter in upright position.

4. The combination of a weighing scale platform, with elements extending along the edges of the platform to swing laterally from an upright position, brackets on the platform and extending outwardly from the said elements to support the latter in outwardly inclined position, toggle joints between the brackets and elements for holding the latter in upright position, and a rod connected with the toggle joints for each element for simultaneously opening or closing all the joints together.

5. The combination of a weighing scale platform, with elements extending along the edges of the platform to swing laterally from an upright position, brackets on the platform and extending outwardly from the said elements to support the latter in outwardly inclined position, toggle joints between the brackets and elements for holding the latter in upright position, a rod connected with the toggle joints for each element for simultaneously opening or closing all the joints together, and a gate carried by each element.

In testimony whereof I affix my signature in presence of two witnesses.

WILLARD D. McCLELLAND.

Witnesses:
EMERSON CAMBLIN,
CHARLIE E. McCLELLAND.

Copies of this patent may be obtained for five cents each, by addressing the "Commissioner of Patents, Washington, D. C."